Nov. 6, 1923.
M. MAAG
1,472,848
DRAG SPINDLE MECHANISM
Original Filed Dec. 31, 1918
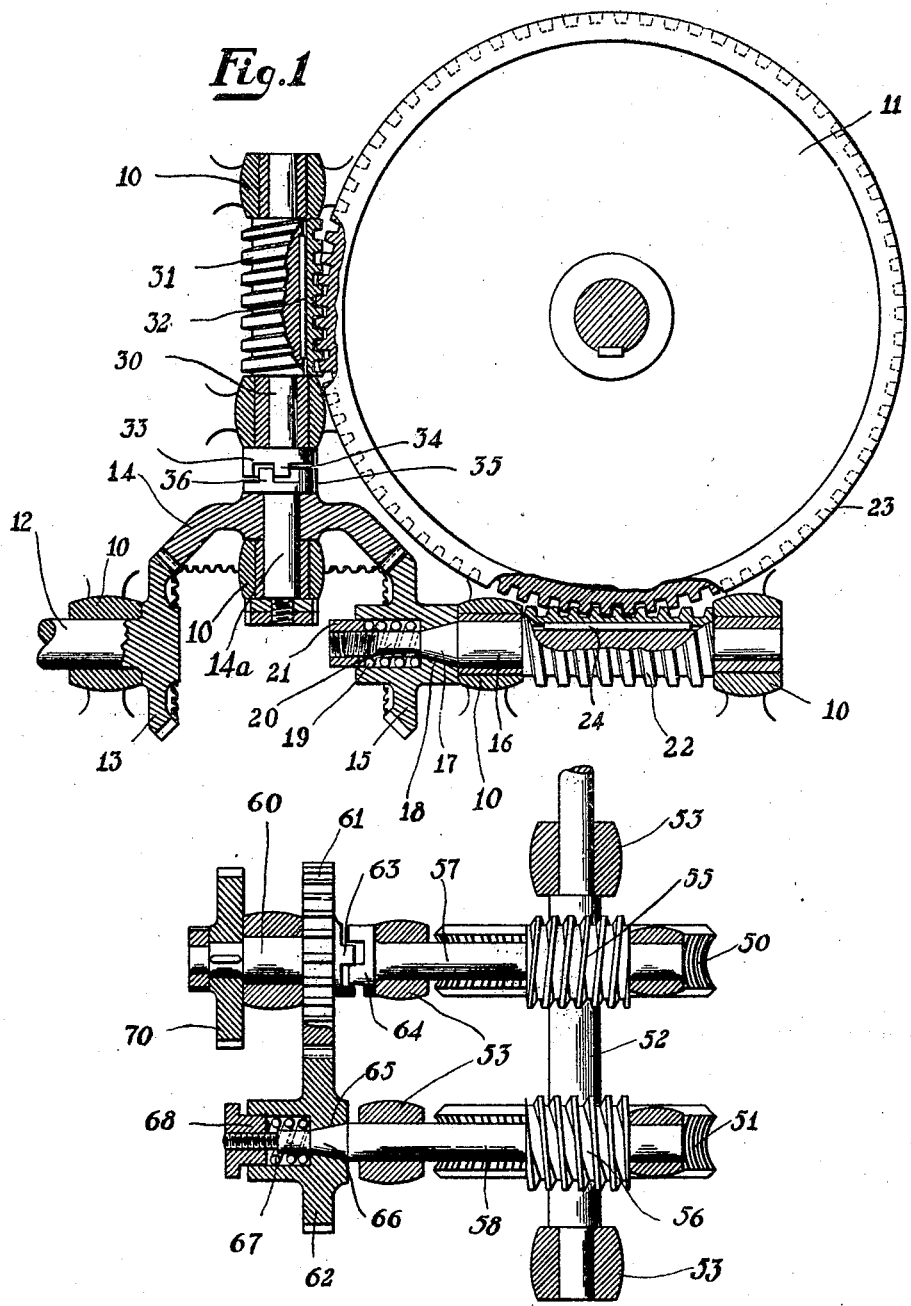
Inventor
Max Maag
By S. Jay Teller
Attorney Patented Nov. 6, 1923.

1,472,848

UNITED STATES PATENT OFFICE.

MAX MAAG, OF ZURICH, SWITZERLAND.

DRAG-SPINDLE MECHANISM.

Original application filed December 31, 1918, Serial No. 269,081. Divided and this application filed October 27, 1920. Serial No. 419,999.

*To all whom it may concern:*

Be it known that I, MAX MAAG, a citizen of the Republic of Switzerland, residing at Zurich, Hardstrasse 219, Switzerland, have invented new and useful Improvements in Drag-Spindle Mechanisms, of which the following is a specification.

This invention relates to driving mechanism for a table or other rotatable element adapted to take up any lost motion between the members of the driving mechanism and the table and positively prevent any retrograde movement of the table while being driven in one direction.

One of the objects of the invention is to provide a driving means for a rotatable machine tool table or analogous element which will take up all lost motion between the parts driving the table and at the same time prevent any retrograde movement of said table or element, and which will further permit the table to be driven in either direction.

Another object of the invention is to provide a frictional and also a positive driving mechanism for a rotatable member, these mechanisms operating to rotate the element at different speeds so that the frictional driving mechanism tends to crowd the rotatable element against one side of the positive driving mechanism.

Another object of the invention is to provide a positive and also a frictional driving mechanism for a rotatable element, both of these driving mechanisms rotating an element or elements to which the table is rigidly attached so that during the rotation of the element in either direction the frictional mechanism will slip and the table or element be rotated positively in accordance with the rotative movement of the positive driving mechanism but will be forced, by means of the more rapidly operating frictional driving mechanism, against one side of the positive driving mechanism.

One feature that is particularly advantageous is that the power mechanism may be reversed and the direction of rotation of the element reversed without danger of cramping the driving mechanisms against each other and thus locking the element in fixed position.

Another object of the invention is to provide a clutch or other means in the positive driving mechanism so that a limited free movement of the parts in the positive driving mechanism is permitted to enable the frictional driving mechanism to first start to drive the rotatable element in either direction.

Another feature of the invention that enables me to reverse the power means without cramping the mechanisms together is the clutch in the postive rotating means. This clutch is provided with teeth and grooves permitting a limited rotary movement of the power end without moving the table driving end of this positive rotary means. The amount of this idle movement between the members of this clutch is sufficient to permit all the lost motion or back lash being taken up in the frictional driving means before the positive driving means becomes effective to drive the table in the opposite direction.

At each reversal of movement of the power means the positive rotating means remains ineffective to rotate the element for an instant until all the lost motion in the frictional rotating members is taken up and the frictional means begins to rotate the element in the opposite direction. As soon as the frictional means actually starts to drive the element in the opposite direction, the positive rotating means may become effective to rotate the element without danger of cramping and binding the mechanisms together.

This application forms a division of my copending application Serial No. 269,081, filed December 31st, 1918.

With the above and other objects in view, my invention consists in the features of construction and operation set forth in the following specification and illustrated in the accompanying drawing forming a part hereof.

In the accompanying drawing I have shown several modifications of the invention which are now deemed preferably, but it is to be understood that changes and modifications may be made within the scope of the appended claims without departing from the spirit of the invention.

In the drawing:

Figure 1 shows a plan view of one modification of the invention with parts broken away to more clearly show the details of construction.

Fig. 2 shows an elevational view of a slightly modified form of the invention.

Briefly my invention comprises the following principal parts: first, a rotatable table or other element; second, positive driving means therefor; third, frictional driving means therefor; and fourth, a clutch or coupling adapted to permit a limited free movement of said positive driving means relative to said table or other rotatable element.

Referring more in detail to the drawing, and in particular to Fig. 1, the machine frame is shown at 10, and on this frame is mounted a rotatable table 11. It is the purpose of the present invention to provide driving means for positively rotating this table 11 in either direction in a manner which will prevent any lost motion between it and its driving means.

The driving means for the table 11 comprises a shaft 12 on which is mounted a bevel gear 13. In mesh with the bevel gear 13 is a bevel gear 14 mounted on a short shaft 14ª and fixed thereto in any convenient manner. In mesh with the bevel gear 14 is a bevel gear 15 mounted loosely on the shaft 16. Shaft 16 is provided with a conical portion 17 fitting a corresponding conical portion 18 on the gear 15. A spring 19 housed in the bevel gear 15 and surrounding the reduced end of the shaft 16 presses the gear 15 against the cone 17. The pressure of these parts may be regulated by a nut 21 which may be adjusted along the threaded end of the shaft 16.

It will be seen from the above that rotation of the shaft 12 will rotate the gear 15 and will also frictionally rotate the shaft 16. On shaft 16 is fixed a worm 22 which is in mesh at the outer periphery of the table 11 with a worm wheel 23. The worm 22 as shown is keyed directly to the shaft 16 by key 24. The worm wheel 23 together with the table 11 will thus be frictionally rotated.

In alignment with the shaft 14ª is a short shaft 30 on which is keyed a worm 31 as by means of the key 32 as shown. At one end of this shaft 30 is a clutch member 33 having teeth 34. On the shaft 15 is a similar clutch member 35 having clutch teeth 36. The notches between adjacent teeth of these clutch members 33 and 35 are of greater width than the teeth so that the teeth of the clutch members have a large amount of lost motion between them, and the gear 14 must therefor move through a fairly large angle before the shaft 30 is rotated. This clutch therefore gives the shaft 14ª a limited free movement relative to the worm 31 and the table 11. It is essential that upon each reversal of the power means 12, the free or idle movement between the members of the clutch 33 and 35 be sufficient to prevent movement of the worm 31 until the worm 22 starts to drive the worm wheel 23 in either direction.

From the above description it will be seen that when the clutch teeth 34 and 36 of the clutch members are in contact, a positive drive is provided for the table 11 from the shaft 12. Also it will be seen that, as the gear 14 is larger than the gear 15, the angular rotation of gear 14 will be less than that of 15. The effect of this is to give the frictionally driven worm 22 a more rapid rotating effect on the worm wheel 23 than on the worm 31. The gear 15, however, frictionally engages the shaft 16 so that the worm 22 and shaft 16 may slip relative to the gear 15.

The worm 31 is positively driven from gears 13 and 14 at a slower rate than worm 22 and the effect of this is to positively rotate the table 11 at a speed determined by the rotative speed and pitch of worm 31. As the worm 22 rotates more rapidly than the worm 31, it forces the table 11 around as far as it will go thus taking up any play or lost motion between the parts of the positive driving members and urging the table 11 always against one side of the helix of the worm 31.

If the rotation of shaft 12 is reversed in order to rotate the table 11 in the opposite direction, it is necessary to provide means to first start the rotating movement by means of the frictionally driven worm, otherwise the effect would be to cramp the two worms toward opposite sides of the teeth on the worm wheel 23 and prevent any further rotation. To permit this frictionally driven worm 31 to start first, the clutch members 33 and 35 are formed as above described.

The first effect of the reversal of movement of shaft 12 is to start the worm 22 in the opposite direction and, by the time the lost motion of its driving members is taken up, and it begins to drive the table 11 in the opposite direction, the clutch teeth 34 and 36 have taken up against their opposite surfaces after rotating through the angle determined by the differences in width of the teeth and grooves formed in the clutch members 33 and 35. In other words, the positive rotating means represented by the worm 31 is rendered ineffective for an instant at each reversal of movement of the shaft 12 until the frictionally driven worm 22 starts to rotate the element or table 11 in the opposite direction. This clutch 33—35 then begins to drive the worm 31 and determines effectively the rotative speed of the table 11.

The worms 22 and 31 are shown disposed at right angles to each other but it is obvious that they may be placed at any angle relative to each other that may be found desirable by varying the angle between the bevel gears 14 and 15. As shown in Figure 1 the worms are of the same form, that is, they are both right hand helices of the same pitch. The helix angle of both these worms is small enough so that the worms are self-stopping or self locking, that is, the worms may not be rotated by pressure applied to rotate the table.

Referring now to the modification shown in Fig. 2, it will be seen that two worm wheels are provided, 50 and 51, both of these being fixed to and rotating with the shaft 52. These are held in a suitable body portion such as a machine base, parts of which are shown at 53. To the upper end of shaft 52, a table, such as that shown at 11, is rigidly secured. In mesh with the worm wheels 50 and 51 are worms 55 and 56 respectively mounted on shaft 57 and 58. The driving means for these worms 55 and 56 and, therefore, for the shaft 52 comprise a short shaft 60, and a gear 61 which is in mesh with gear 62 and shaft 58. At the forward end of the shaft 60 is a clutch member 63 meshing with corresponding clutch member 64. The members of this clutch 63 and 64 are provided with a certain amount of lost motion by making the width of the teeth of each part less than the width of the grooves so that the shaft 60 may have a limited free movement relative to the worm 55. This clutch is similar in every way to the clutch shown in Fig. 2 and further description is not, therefore, necessary.

The gear 62 is provided with a conical portion 65 contacting with a conical portion 66 on the shaft 58 and housed in the gear 62 is a spring 67 adapted to force the gear 62 against the conical portion 66. A nut 68 serves to adjust the force of the spring 67. Any driving means may be provided to rotate the shaft 60 in either direction such as a gear 70.

It will be seen, therefore, that both a positive and a frictional drive have been provided in this modification for the shaft 52 to which a table or other rotating element may be fastened. Rotation of the shaft 60 by means of gear 70 in either direction will rotate the worm wheel 50 and consequently the shaft 52 will be positively rotated. The shaft 58, through gears 61 and 62 and the frictional clutch 65, 66 will be frictionally driven and thus will frictionally rotate the shaft 52. The worm wheels 50 and 51 may be provided with a slightly different number of teeth so that the worm wheel 51 tends to drive the shaft 52 at a slightly different speed than the worm wheel 50. The same result may be accomplished by providing a different number of teeth in gears 61 and 62 in which case the worm wheels 50 and 51 would have the same number of teeth. In either case the worm 56 is compelled to slip at the clutch 65—66, at the same time continuously forcing the shaft 52 in one direction with sufficient force to take up all lost motion between the positive driving means.

Reversing the direction of rotation of the shaft 60 serves first to reverse the worm 56 and thus start the rotation of the worm 51 in the opposite direction. As soon as the lost motion between the parts of the coupling 63—64 is taken up the direction of rotation of worm wheel 50 is reversed and the shaft 52 is constrained to rotate in accordance with the speed of rotation of worm wheel 50, the shaft 58 slipping within the gear 62 at the frictional clutch 65, 66.

In this embodiment of the invention the worms are of different form, that is, one worm is a right hand and the other worm left hand helix. Also, their pitch may be different as shown but it is obvious that the pitch may be the same and the rotative speeds of the worms varied so that the effective speed of the frictionally driven worm is greater than that of the positively driven worm.

Thus, the shaft 52 may be rotated in either direction at a definite speed of revolution and the lost motion or "back lash" of its driving members is always taken up and the table or other element mounted on shaft 52 is held positively against retrograde movement.

What I claim is:

1. Means for rotating an element comprising in combination, a positively driven worm, a worm wheel in mesh therewith and rotatable with said rotatable element, a frictionally driven worm meshing with said worm wheel, a clutch between the positively driven worm and its driving means permitting a limited idle movement of said positive driving means relative to its worm, and common driving means for said worms.

2. A drag spindle gear comprising in combination, a rotatable element, reversible power means, frictional rotating means for said element, positive rotating means for said element, a clutch in said positive rotating means having inter-engaging members permitting a limited idle angular movement between the parts of the positive rotating means so that the positive rotating means may remain ineffective until the frictional rotating means starts to drive the element upon each reversal of the power means, and common driving means for said positive and frictional rotating means.

3. A drag spindle gear comprising in combination, an element to be rotated, reversible power means, and two drivers for rotating the said element, connected, respectively, positively and frictionally to the power means, the said positive connection serving to operate its driver at an effective speed slower than that of the other driver and a loose connection therein permitting its driver, upon reversal of the power means, to remain ineffective for an instant until the other driver becomes effective to rotate said element in the opposite direction.

4. A drag spindle gear comprising in combination, an element to be rotated, reversible power means, and two drivers for rotating the said element connected, respectively, positively and frictionally to the power means, the said positive connection serving to operate its driver at an effective speed slower than that of the other driver and a loose connection therein permitting a limited idle rotary movement between said positive connection and its driver whereby, upon reversal of the power means, the driver remains ineffective for an instant until the other driver becomes effective to rotate said element in the opposite direction.

5. A drag spindle gear comprising in combination, an element to be rotated, reversible power means, and two drivers for rotating the said element connected, respectively, positively and frictionally to the power means, the power connections for said frictionally driven driver having lost motion therein, the said positive connection serving to operate its driver at an effective speed slower than that of the other driver and a loose connection therein permitting a limited idle rotary movement between said positive connection and its driver whereby, upon reversal of the power means, the driver remains ineffective for an instant until the other driver overcomes the lost motion between its driving connections and becomes effective to rotate said element in the opposite direction.

6. A drag spindle gear comprising in combination, an element to be rotated, reversible power means, and two drivers for rotating the said element connected, respectively, positively and frictionally to the power means, the said positive connection being in alignment with its driver and serving to operate its driver at an effective speed slower than that of the other driver and a loose connection therein permitting a limited idle rotary movement between said positive connection and the driver whereby, upon reversal of the power means, the driver remains ineffective during a slight rotary movement of its driving connection until the other driver becomes effective to rotate said element in the opposite direction.

7. A drag spindle gear comprising in combination, an element to be rotated, reversible power means, and two self-stopping drivers for the said element connected, respectively, positively and frictionally to the power means, the said positive connection serving to operate its driver at an effective speed slower than that of the other driver and a loose connection therein permitting its driver, upon reversal of the power means, to remain ineffective for an instant until the other driver becomes effective to rotate said element in the opposite direction.

8. A drag spindle gear comprising in combination, an element to be rotated, reversible power means, and two self-stopping drivers for the said element, connected, respectively, positively and frictionally to the power means, the said positive connection serving to operate its driver at an effective speed slower than that of the other driver and a loose connection therein permitting a limited idle rotary movement between said positive connection and its driver, whereby upon reversal of the power means, the driver remains ineffective for an instant until the other driver becomes effective to rotate said element in the opposite direction.

9. A drag spindle gear comprising in combination, an element to be rotated, reversible power means, and two self-stopping drivers for the said element, connected, respectively, positively and frictionally to the power means, the said positive connection being in alignment with its driver and serving to operate its driver at an effective speed slower than that of the other driver and a loose connection therein comprising a toothed clutch permitting its driver, upon reversal of the power means, to remain ineffective for an instant until the other driver becomes effective to rotate said element in the opposite direction.

In testimony whereof, I hereto affix my signature.

MAX MAAG.